(12) United States Patent
Laudet

(10) Patent No.: US 8,905,461 B2
(45) Date of Patent: Dec. 9, 2014

(54) TRUCK AND METHOD FOR CONTROLLING SUCH A TRUCK

(75) Inventor: Frédéric Laudet, Venissieux (FR)

(73) Assignee: Renault Trucks, St. Priest (FR)

( * ) Notice: Subject to any disclaimer, the term of this patent is extended or adjusted under 35 U.S.C. 154(b) by 0 days.

(21) Appl. No.: 13/993,008

(22) PCT Filed: Dec. 27, 2010

(86) PCT No.: PCT/IB2010/003513
§ 371 (c)(1),
(2), (4) Date: Jun. 10, 2013

(87) PCT Pub. No.: WO2012/090020
PCT Pub. Date: Jul. 5, 2012

(65) Prior Publication Data
US 2013/0270856 A1    Oct. 17, 2013

(51) Int. Cl.
B62D 35/00    (2006.01)
(52) U.S. Cl.
CPC .............. *B62D 35/00* (2013.01); *B62D 35/001* (2013.01); *Y10S 180/903* (2013.01)
USPC ................... 296/180.2; 296/180.3; 296/180.5; 180/903
(58) Field of Classification Search
CPC .... B62D 35/00; B62D 35/001; B62D 35/005; B62D 37/00; B62D 37/02; B60K 11/08; B60K 11/085
USPC .......... 296/180.1, 180.2, 180.3, 180.5, 181.5; 180/903
See application file for complete search history.

(56) References Cited

U.S. PATENT DOCUMENTS

| | | | | | |
|---|---|---|---|---|---|
| 4,018,472 A | * | 4/1977 | Mason, Jr. | ................. | 296/180.2 |
| 4,102,548 A | * | 7/1978 | Kangas | ..................... | 296/180.3 |
| 4,308,983 A | * | 1/1982 | Yoshida | ........................ | 224/316 |
| 4,353,587 A | * | 10/1982 | Brenholt | .................... | 296/180.3 |
| 4,375,898 A | * | 3/1983 | Stephens | .................... | 296/180.3 |
| 4,611,796 A | * | 9/1986 | Orr | ............................ | 296/180.2 |
| 4,824,165 A | * | 4/1989 | Fry | ............................ | 296/180.3 |
| 5,174,626 A | * | 12/1992 | Wiley et al. | ................ | 296/180.1 |

(Continued)

FOREIGN PATENT DOCUMENTS

| | | |
|---|---|---|
| DE | 3916692 A1 | 11/1990 |
| EP | 1043218 A1 | 10/2000 |
| GB | 2136362 A | 9/1984 |

OTHER PUBLICATIONS

German to English translation of DE 39 16 692 (German doc provided by applicant), retrieved from ESPACENET on Apr. 29, 2014 via Patenttranslate.*

(Continued)

*Primary Examiner* — Glenn Dayoan
*Assistant Examiner* — Jason S Daniels
(74) *Attorney, Agent, or Firm* — WRB-IP LLP

(57) ABSTRACT

A truck has a cabin, the cabin having a roof and an aerodynamic roof deflector panel mounted on the roof and covering at least partly the roof, thereby delimiting a space extending between the roof and the panel. The panel includes at least a member movable between a first position and a second position. In the second position of the movable member, an air passage is created in front of the space. In the first position, the air passage is closed or substantially closed.

14 Claims, 4 Drawing Sheets

(56) References Cited

U.S. PATENT DOCUMENTS

| | | | | |
|---|---|---|---|---|
| 5,317,880 A | * | 6/1994 | Spears | 62/239 |
| 6,099,069 A | * | 8/2000 | Spears | 296/180.2 |
| 7,984,920 B2 | * | 7/2011 | Alguera | 280/438.1 |
| 2005/0173945 A1 | * | 8/2005 | Frank et al. | 296/180.5 |

OTHER PUBLICATIONS

International Search Report (May 19, 2011) for corresponding International App. PCT/IB2010/003513.

* cited by examiner

TRUCK AND METHOD FOR CONTROLLING SUCH A TRUCK

BACKGROUND AND SUMMARY

The invention relates to a truck having a cabin on which air aerodynamic roof deflector panel is mounted. The invention also relates to a method for controlling such a truck.

When trucks are stopped on parking areas with their engine stopped, the main air conditioning system of these trucks does not operate. Some trucks have auxiliary air conditioning systems. Such auxiliary systems are not efficient enough in case the truck is parked in direct sunshine in summer time. Consequently, the cabin of the truck can reach uncomfortable temperatures for the driver, who may wish to rest in his cabin.

Generally, trucks are equipped with a roof wind deflector adapted to reduce air drag produced by the height difference between the roof of the cabin and the top of the transport compartment or the trailer of the truck. It is known, for example, from GB-A-2 136 362 to use the deflector as a sun shield.

The solutions known from the prior art do not permit to create air efficient insulation, in order to prevent the cabin of the driver to reach air uncomfortable temperature. Indeed, the air trapped in the space delimited between the roof and the deflector panel eventually heats up and therefore creates a hot air bubble just on top of the roof.

It is desirable to provide a new truck having a cabin adapted to provide air efficient sun insulation when the truck is parked, especially with its engine shut down.

To this end, the invention concerns, according to air aspect thereof, a truck having a cabin, said cabin having a roof and air aerodynamic roof deflector panel mounted on said roof and covering at least partly said roof. The panel comprises at least a member movable between a first position and a second position. This truck is characterized in that, in the second position, an air passage is created in front of the space, whereas in the first position, the air passage is closed or substantially closed.

Thanks to an aspect of the invention, the space on top of the cabin of the truck is well insulated from the sun thanks to the panel and to the ability given to air to circulate between the panel and the roof of the cabin when the movable member is in its second position, thereby limiting the temperature of the air in contact with the roof of the cabin. In the meaning of this invention, the front of a part or a volume is a portion of a part or a volume oriented towards the front side of the vehicle that is the side of the vehicle which moves ahead of the other parts when the vehicle travels in normal road conditions. A first part or volume is in trout of a second part or volume when the first part or volume is ahead of the second part or volume when the vehicle travels in normal road conditions.

According to further aspects of the invention which are advantageous but not compulsory, such a truck may incorporate one or several of the following features:

- In the first position of the movable member, a front edge of said member, extending in a substantially horizontal direction, is close to or in contact with the roof, and in the second position, this front edge is remote from the roof, at a distance of the roof larger than 30 mm, preferably larger than 60 mm.
- In the second position of the movable member, at least one side edge of this member is remote from a lateral surface of the cabin.
- The distance between the front edge of the movable member and the roof is adjustable.
- The truck comprises means, in particular fans, to initiate convection heat exchanges between air and the roof of the cabin in the space extending between the roof and the panel.
- The truck comprises means to seal a junction zone between the member and the roof of the cabin.
- The means to seal the junction comprise a sealing gasket and/or compressible foam adapted to lay in a sealed manner between, on the one hand, the front edge and/or a side edge of the member and, on the other hand, the roof of the cabin.
- The movable member can be moved into air intermediate position, in which the distance between the front edge of the movable member and the roof is lower than in the second position.
- The movable member is the totality of the panel.
- The truck comprises sliders and at least one actuator adapted to move the panel in translation along the sliders from its first position to its second position.
- The truck comprises one or several actuators adapted to elevate the panel relative to the roof of the cabin and to move the panel to air advanced position relative to the roof of the cabin.
- The panel is mounted on the roof of the cabin thanks to articulated arms, whereas it comprises at least one actuator adapted to simultaneously elevate the panel relative to the roof of the cabin and move the panel forward relative to the roof of the cabin.
- The or each movable member is a flap consisting in or comprising a portion of the panel.
- The truck comprises several flaps mounted in the vicinity of the front side of the cabin and in the vicinity of lateral surfaces of the cabin.
- The truck comprises means to move the movable member with respect to the roof on the basis of parameters representing the operating state of the truck and/or a temperature measured in the cabin, in the space extending between the panel and the roof and/or in the ambient air.

The invention also relates according to air aspect thereof to a method for controlling a truck having a cabin, said cabin having a roof and air aerodynamic roof deflector panel mounted on said roof and substantially parallel to said roof. This method comprises a step consisting in or comprising moving least a portion of the panel from a first position to a second position. According to air aspect of the invention, in the second position, an air passage is created in front of a space extending between the roof and the panel whereas, in the first position, the air passage is closed or substantially closed.

According to further aspects of the invention which are advantageous but not compulsory, such a method may incorporate one or several of the following features:

- The step of moving said portion of the panel from its first position to its second position is implemented when air internal combustion engine of the truck is shut down and/or when a park brake is activated.
- The step of moving said portion of the panel from its first position to its second position is implemented when a temperature, measured in the cabin, in a space extending between the panel and the roof and/or in the ambient air, reaches a threshold value.

BRIEF DESCRIPTION OF THE DRAWINGS

The invention will now be explained in correspondence with the following figures, as an illustrative example, without restricting its object. In the annexed figures.

DETAILED DESCRIPTION

Figure 1:
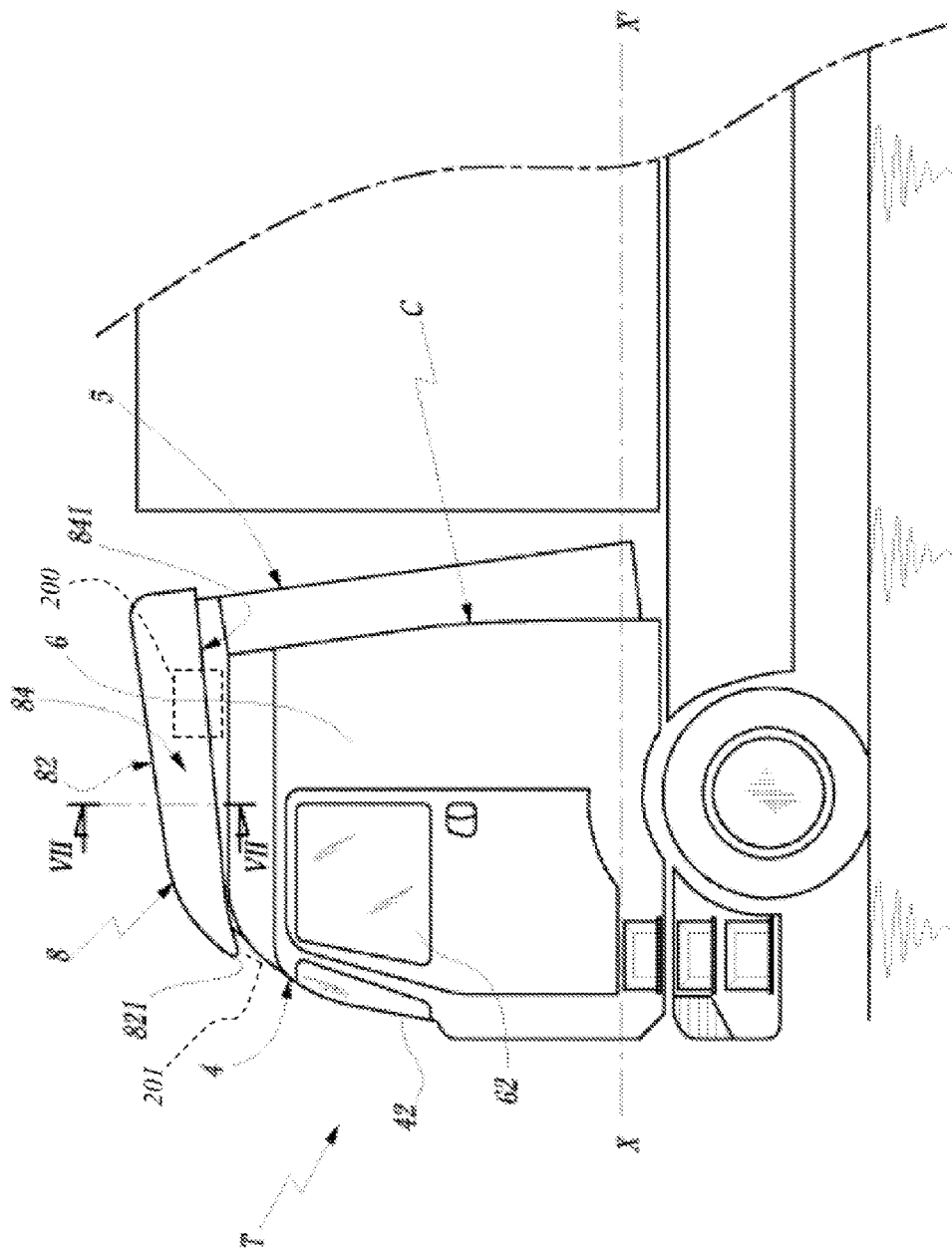
FIG. 1 is a partial side view of a truck according to the invention.
Figure 2:
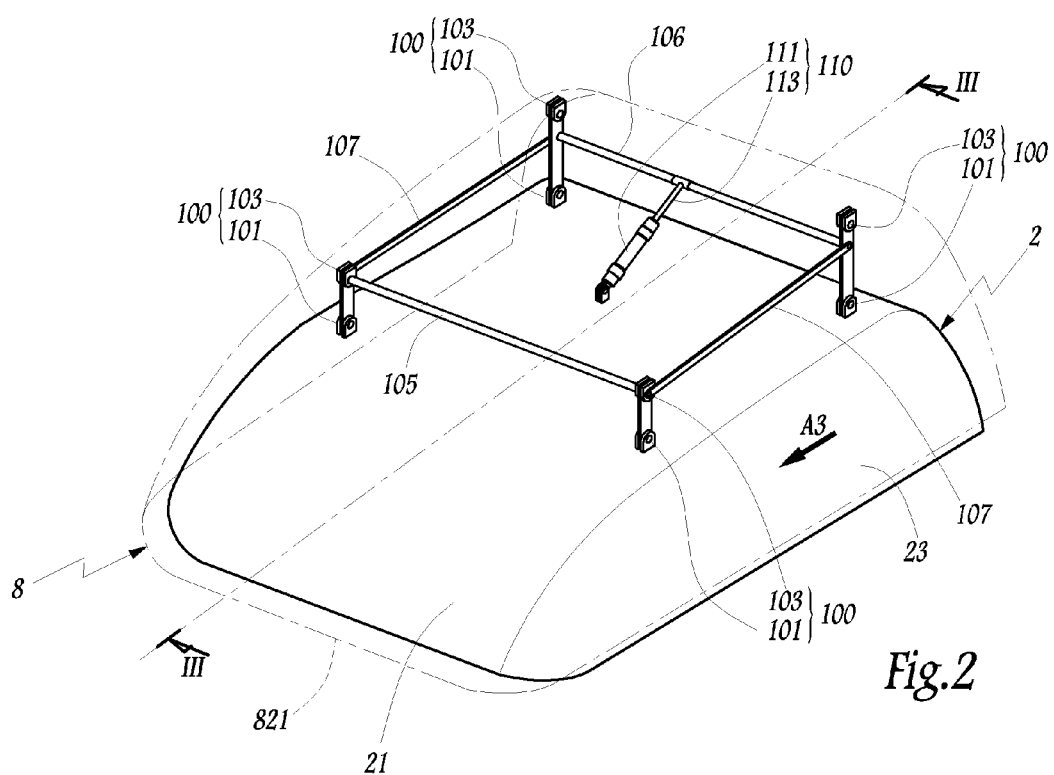
FIG. 2 is a perspective view of the roof of the truck of FIG. 1, with air insulation panel represented as transparent for the sake of clarity.

As represented on FIGS. 1 to 7, a truck T comprises a cabin C having a roof 2. Roof 2 is represented as having a central continuous wall 21 and two lateral walls 23. The roof is the limit between the cabin interior and the exterior of the cabin. Central wall 21 extends along a slightly curved aerodynamic shape from a front side 4 of cabin C, on which a windshield 42 is mounted, to a rear side 5 of cabin C which is oriented towards the load compartment or the trailer of truck T. Front side 4 defines the front side of truck T. Each lateral wall 23 extends between central wall 21 and a lateral surface 6 of cabin C, on which a door having a side window 62 is mounted. The driver space of cabin C is located under roof 2.

X-X' designates a longitudinal axis of truck T.

Truck T further comprises air aerodynamic roof deflector panel 8 which has a substantially homothetic form with respect to roof 2. The roof deflector panel 8 covers the roof. At its front end, it is close to the roof and, at its rear end, it is elevated above the roof. In other words, the roof deflector is inclined over the roof from front to rear and thereby defines a space above the roof, this space being substantially closed at its front end. This space is usually open at its rear end, towards the load compartment or the trailer of the truck. As well known, some roof deflectors are adjustable, essentially by modifying the elevation of their rear edge, for example to adapt the angle of the deflector to the height of different trailers. Panel 8 may comprise a central portion 82 extending between a front edge 821 and a rear edge 823. Panel 8 may also comprise two lateral portions 84, each extending between central portion 82 and a lateral edge 841.

When truck T is moving on the road with its engine running, an air conditioning system of truck T is operating and the driver is therefore provided with refreshed air and has comfortable driving conditions. In this case, panel 8 is in a first position represented on FIG. 3 in which front edge 821 and side edges 841 are in contact or in close proximity with roof 2 so that most of the airflow which impinges on the top of the cabin and on the roof deflector is effectively deflected upwards by a top surface of the panel and so that no air or a very low quantity of air circulates between panel 8 and roof 2. It can be useful to leave a thin interval between, on the one hand, front and side edges 821 and 841 and, on the other hand, roof 2 so as to prevent vibrations of panel 8 to spread to cabin C. This thin interval may be in the order of 10 to 20 millimeters (mm). In this moving configuration, where the roof deflector has air aerodynamic function, front edge 821 is close to or in contact with roof 2, the distance between these two items being preferably inferior to 20 mm, so as not to compromise the aerodynamic function of the deflector According to air optional feature, contact between panel 8 and roof 2 is made substantially airtight, for example along the front edge 821 of the deflector panel. This can be achieved for example thanks to a sealing gasket 9 arranged at the junction between panel 8 and roof 2. Sealing gasket 9 is adjacent to edges 821 and 841. Air tightness between roof 2 and panel 8 can also be realized thanks to compressible foam. This tightness permits to reduce drag and noise which may occur when air circulates between roof 2 and panel 8 while truck T moves.

In a stopped configuration of truck T or at very low speed, one needs to avoid overheating of cabin C. To this end, according to air aspect of the invention, the panel 8, a part thereof or a part continuous thereto is moved to a second position so that an air passage AP is created in front of the above-mentioned space, whereas in the first position, the air passage AP is closed or substantially closed. As shown on FIG. 4, air passage AP is in front of the volume extending between roof 2 and panel 8 when panel 8 is in its second position. In this second position, the space defined between the roof and the deflector panel becomes a kind of air duct having a front opening, that is the air passage AP, and having a rear opening.

The air duct can be more or less closed on its sides, depending on the respective shapes of the roof and of the deflector panel. Advantageously, the top wall of this air duct is formed by the roof deflector which is inclined upwards to the rear. Thereby, when the panel is exposed to the sunshine and becomes hot, the air just underneath it which may be heated by the panel will inevitably flow upwards and rearwards, by convection, thereby promoting the circulation of air in the space between the roof and panel in way similar to a chimney.

Of course, even when the deflector panel is in its second position, it should cover a major part of the roof so as to protect the roof from direct sunshine. Preferably, the deflector panel should cover, when viewed from the top, at least 50% and more preferably at least 70% of the roof, so as to effectively protect the roof from getting hot due to direct sunshine.

Figure 4:
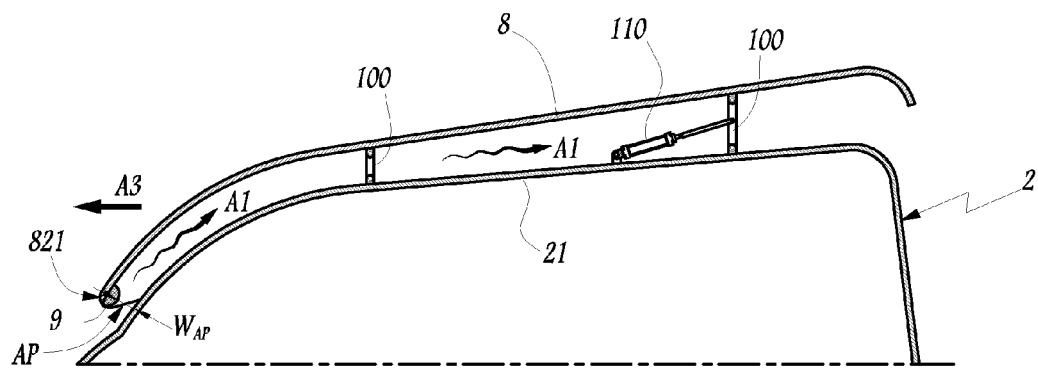
FIG. 4 is a sectional view similar to FIG. 3, in a second configuration.

In the shown example, it can be clearly seen that the air passage AP is created between front edge 821 and roof 2 in the vicinity of front surface 4, as shown on FIG. 4. This induces an air flow, shown by arrows A1, from the front to the back of the space extending between roof 2 and panel 8. This air flow limits the temperature increase of the air circulating between roof 2 and panel 8. In this configuration, front edge 821 is remote from roof 2 at a distance superior to 30 mm, preferably between 60 and 200 mm.

In this embodiment, panel 8 is mounted on roof 2 thanks to four support arms 100, each having one end 101 articulated on central wall 21 and another end 103 articulated on panel 8. Arms 100 are mounted at four corners of roof 2. Two arms 100 located in the vicinity of front side 4 are connected to each other by a transversal front rod 105 and two arms 100 located in the vicinity of rear side 5 are connected to each other by a transversal rear rod 106. Front and rear arms 100 are connected by two lateral rods 107.

In this embodiment, truck T comprises a single actuator, which can be a hydraulic or pneumatic cylinder 110 having its casing 111 articulated on roof 2 and its rod 113 articulated on rear transversal rod 106. Cylinder 110 is adapted to create air passage AP by simultaneously elevating and moving panel 8 forward with respect to roof 2, in a direction parallel to axis X-X', as shown by arrow A3. Other types of actuators could be used, such as electric motors.

Figure 3:
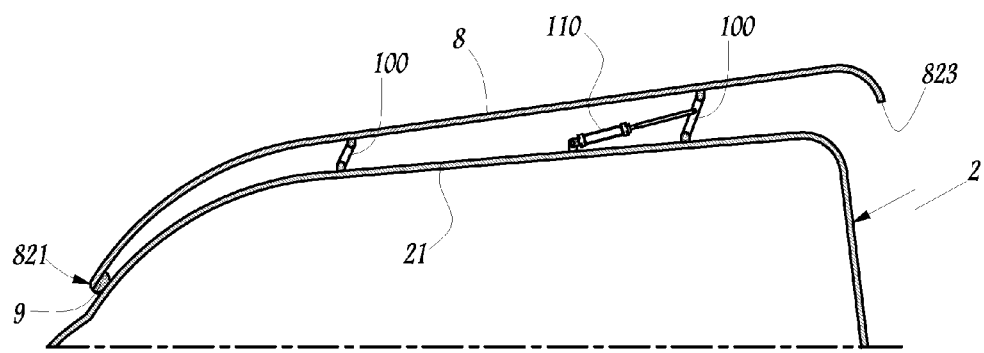
FIG. 3 is a longitudinal sectional view of the roof and panel along line III-III on FIG. 2, in a first configuration.

In the moving configuration of FIG. 3, rod 113 is positioned with respect to housing 111 so that front edge 821 of panel 8 presses sealing gasket 9 against roof 2.

In a second configuration represented on FIG. 4, rod 113 is moved in air intermediate position with respect to housing 111, to create air passage AP between front edge 821 and roof 2. This configuration provides a thin air passage and can be adapted to a slow moving configuration of truck T, e.g. in a traffic jam.

Figure 5:
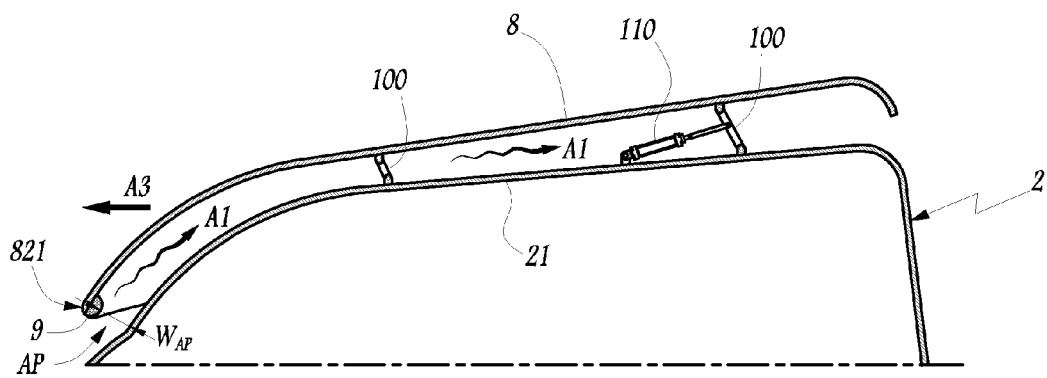
FIG. 5 is a sectional view similar to FIGS. 3 and 4, in a third configuration.

In a third configuration represented on FIG. 5, which corresponds to the stopped configuration of truck T, rod 113 is fully retracted in casing 111, so that panel 8 moves even more towards the front of truck T, along a direction parallel to axis X-X', which provides a large air passage AP. In this configuration, front edge 821 extends above front side 4, in overhang with respect to roof 2. This configuration is adapted to the phases during which the engine of truck T is running or shutdown. For example, truck T can be stopped with the engine running in order to drive a concrete mixer. The air passage can be useful in such a case to help the main air conditioning system of truck T.

WAP denotes the distance between roof 2 and front edge 821 of panel 8. In the example shown, WAP extends between sealing gasket 9 and roof 2. WAP is null in the configuration of FIG. 3 since no air passage exists. WAP has a first value in the configuration of FIG. 4 and a second value, larger than the first value, in the configuration of FIG. 5. Thus, an air flow with a larger flow rate can circulate between panel 8 and roof 2 in the configuration of FIG. 5.

In this embodiment, air passages AP are also created on the sides of cabin C. In other words, the respective shapes of roof 2 and panel 8 induce that, during the movement of panel 2 between its first position to its second position, side edges 841 of panel 8 become remote from lateral walls 23 at a distance which is in a range similar to the range of the distance WAP between front edge 821 and roof 2.

Air passage AP is created temporarily in so far as, when truck T starts a new mission, cylinder 110 is activated to bring panel 8 back to the position of FIG. 3 in order not to generate flow perturbation, in particular noise, when truck T is moving.

In a non shown configuration of the first embodiment, which corresponds to air intermediate position between the first and second configurations, panel 8 can be moved so that front edge 821 is slightly remote from roof 2 which respect to the first configuration, while sealing gasket 9 is still in contact with roof 2. With this configuration, the aerodynamic characteristics of truck T can be adapted to its moving conditions, using the same means that allow to vary distance WAp. Also, compared to the configuration of FIG. 3, the cylinder rod could be extended even further out of the body so as to achieve a further position for the deflector panel 8 where the rear edge 823 of the deflector panel 8 would be in a lower position. In such position, the panel 8 would be almost parallel to the roof and almost right against the roof. The low profile position of the roof deflector may be useful if a semi-trailer of small height or if no semi-trailer at all would be towed by the truck.

With this embodiment, one can see that, with a single actuator, it is first possible to adjust the height of the deflector panel, for example for different semi-trailers, while still having the front edge of the panel sufficiently close to the roof so that the panel still functions in an aerodynamically satisfactory way and then to bring the panel to a second position where it creates an air opening to promote air circulation between the roof and the deflector panel, even if the truck is stopped.

As air alternative embodiment, rod 113 of cylinder 110 can be articulated on transversal front rod 105. The operating conditions of cylinder 110 can also be inverted relative to the one described.

Figure 6:
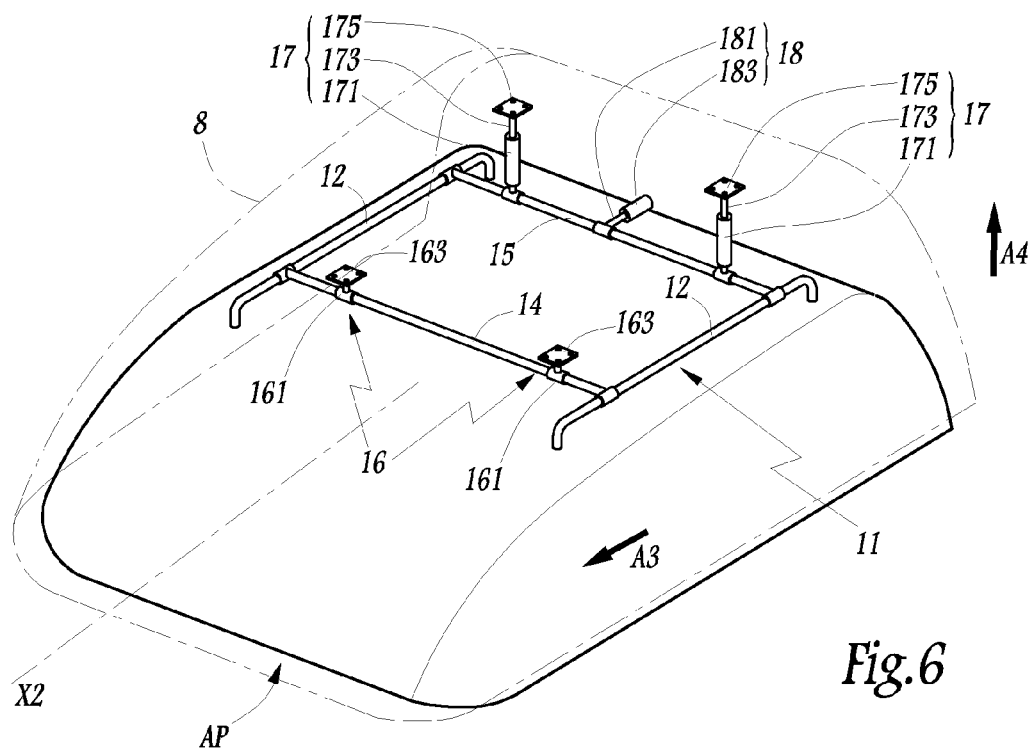
FIG. 6 is a perspective view similar to FIG. 2 for a truck according to a second embodiment of the invention and FIG. 7 is a sectional perspective view, along a plane similar to plane VII-VII on FIG. 1, for a truck according to a third embodiment of the invention.

A second embodiment is represented on FIG. 6. In this embodiment, a frame 11 mounted on roof 2 supports panel 8. This frame 11 includes two bars 12 parallel to a central longitudinal axis X2 of roof 2 which is parallel to axis X-X', at a given distance with respect to central wall 21. Bars 12 are connected to each other by a front transversal rod 14 and a rear transversal rod 15, which are mounted on bars 12 in a slidable way so as to translate with respect to bars 12 along longitudinal axes of bars 12, which are also parallel to axis X-X'.

Two support members 16 are mounted on front arm 14. Each support member 16 has a first end 161 articulated with respect to arm 14. A second end comprises a flange 163 for fastening support elements 16 to panel 8.

Two hydraulic or pneumatic cylinders 17 are mounted on rear arm 15. The casing 171 of each cylinder 17 is articulated with respect to rear arm 15, and the rods 173 of cylinders 17 are fixed to panel 8 thanks to fastening flanges 175.

A third hydraulic or pneumatic cylinder 18 is mounted between rear arm 15 and roof 2. Its rod 181 is fast in translation with arm 15 and its casing 183 is fixed with respect to roof 2.

In this embodiment, air passage AP is created by moving panel 8 in translation with respect to roof 2 along axis X-X' towards front surface 4, as shown by arrow A3, and by rotating panel 8 with respect to front arm 14, as shown by arrow A4. The translation movement A3 is obtained with cylinder 18 and the rotation movement A4 is obtained with cylinders 17. The translation allows creating an air passage AP as in the first embodiment and the rotation permits to enlarge air passage AP with respect to the first embodiment and to improve the cooling of cabin C by convection. In this position, front edge 821 extends above front side 4, in overhang with respect to roof 2. Moreover, this permits also to create air passages AP between lateral edges 841 and lateral surfaces 6.

Figure 7:
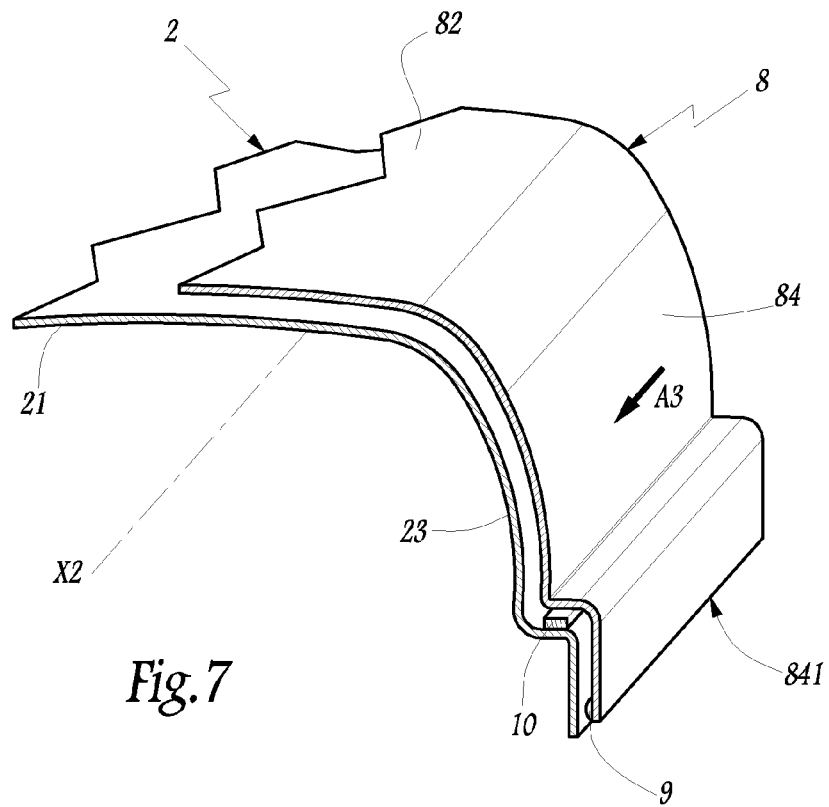

According to a third embodiment represented on FIG. 7, an air passage is created by moving panel 8, as shown by arrow A3, from its first position to a second position, in which it is advanced with respect to roof 2 along a substantially horizontal axis X2, which is parallel to longitudinal axis X-X of truck T. In the second position, the front edge of panel 8 extends above the front side of cabin C, in overhang with respect to roof 2. To this end, sliders 10 are arranged between side walls 23 of roof 2 and side portions 84 of panel 8, so as to permit translation of panel 8 with respect to roof 2 along axis X-X'. An actuator, such as a hydraulic cylinder or air electric motor, is used to move panel 8 along slider 10.

In the previously described embodiments, the forward movement of panel 8 with respect to roof 2 is preferably of such air extent that front edge 821 overhangs above front side 4. Ideally, it would be preferable to have the front edge 821 in front of the windscreen to as to allow the air passage to capture any air flow naturally circulating upwards along front side 4.

According to another embodiment, air passage AP can be created by moving one or several flaps 201 (shown in phantom in FIG. 1) adapted to move between a first position, in which they obturate one or several spaces between panel 8 and roof 2, and a second position, in which they allow passage of air between panel 8 and roof 2. Truck T could comprise several flaps. Such flaps could be articulated on each edge of panel 8. Alternatively one or several flaps could for example have a translation movement substantially parallel to the panel surface, as in a grille with slidable shutters. The flaps could be fitted on the deflector panel or on the roof. They could be arranged at the interface between the roof and the deflector panel, for example along the from edge of the deflector panel 8, or could be offset from that front edge. With such moveable flaps, the deflector panel 8 could then be fixed with respect to roof 2, at least with respect to the insulating function as there may remain the need of an adjustable deflector to adapt the aerodynamic, for example as a function of the height of a semi-trailer to be towed by the truck.

According to a non-shown embodiment, truck T comprises means to force air circulation in the air passage between roof 2 and panel 8. These means can comprise, for example, a ventilation system involving fans 200 (shown in phantom in FIG. 1) mounted on roof 2 or on an inner surface of panel 8.

According to a non-shown embodiment, truck T comprises air electronic control unit adapted to communicate, thanks to electronic signals, with a temperature sensor, which can for example be installed in cabin C, or in the space extending between the roof and the deflector panel, or installed to estimate ambient air temperature. This electronic control unit is adapted to control the movement of panel 8 with respect to roof 2, and particularly the operation of cylinders 17, 18 and 110. In case too high a temperature is detected during air idle period of truck T, air passage AP is created between roof 2 and panel 8.

In the same way, the electronic control unit can be adapted to communicate with a control unit of the engine of truck T so as to detect its operating conditions changes. When a shutting down of the engine of truck T and/or an actuation of its park brake is detected, air passage AP is automatically created between panel 8 and roof 2 so as to substitute the convection cooling of cabin C to the air conditioning system of truck T.

According to a non shown embodiment, the electronic control unit can be adapted to communicate with a photovoltaic sensor which detects the luminosity, in order to anticipate an overheating of the cabin. The photovoltaic sensor could be a photovoltaic electricity generator able to generate enough electricity to feed air electric actuator capable of moving the deflector panel from its first position to its second position and vice-versa, without needing to rely on the truck's battery.

The technical features of the embodiments mentioned here above can be combined to create other embodiments of the invention.

The invention claimed is:

1. A truck comprising
a cabin, the cabin having
a roof and
an aerodynamic roof deflector panel mounted on the roof and covering at least partly the roof thereby delimiting a space extending between the roof and the panel, wherein the panel comprises at least a member movable between a first position and a second position, wherein in the second position, an air passage is created in front of the space, whereas in the first position, the air passage is closed or substantially closed,
means to move the movable member with respect to the roof based on parameters representing a temperature measured in at least one of the cabin, the space extending between the panel and the roof, and the ambient air,
articulatable arms for mounting the panel, and
at least one actuator adapted to simultaneously elevate the panel relative to the roof of the cabin and move the panel forward relative to the roof of the cabin.

2. The truck according to claim 1, wherein, in the first position of the movable member, a front edge of the movable member, extending in a substantially horizontal direction, is close to or in contact with the roof, and in the second position, the front edge is remote from the roof, at a distance of the roof larger than 30 mm, preferably larger than 60 mm.

3. The truck according to claim 1, wherein, in the second position of the movable member at least one side edge of the member is remote from a lateral surface of the cabin.

4. The truck according to claim 2, wherein the distance between the from edge of the movable member and the roof is adjustable.

5. The truck according to claim 1, comprising fans to initiate convection heat exchanges between air and the roof of the cabin in the space extending between the roof and the panel.

6. The truck according to claim 1, comprising means to seal a junction zone between the member and the roof of the cabin.

7. The truck according to claim 6, wherein the means to seal the junction comprises a sealing gasket and/or compressible foam adapted to lay in a sealed manner between, on the one hand, the front edge and/or a side edge of the member and, on the other hand, the roof of the cabin.

8. The truck according to claim 1, wherein the movable member can be moved into an intermediate position, in which the distance between the front edge of the movable member and the roof is lower than in the second position.

9. The truck according to claim 1, wherein the movable member is the totality of the panel.

10. The truck according to claim 9, comprising sliders and at least one actuator adapted to move the panel in translation (A3) along the sliders from its first position to its second position.

11. The truck according, to claim 1, wherein the or each movable member is a flap consisting in or comprising a portion of the panel.

12. The truck according to claim 11, comprising several flaps mounted in the vicinity of the front side of the cabin and in the vicinity of lateral surfaces of the cabin.

13. The method for controlling a truck having a cabin, the cabin having a roof and an aerodynamic roof deflector panel mounted on the roof via articulatable arms and substantially parallel to the roof, comprising
moving at least a portion of the panel from a first position to a second position, wherein in the second position, an air passage is created in front of a space extending between the roof and the panel whereas, in the first position, the air passage is closed or substantially closed, wherein the step of moving the portion of the panel from its first position to its second position is performed when a temperature, measured in at least one of the cabin, the space extending between the panel and the roof, and the ambient air, reaches a threshold value, and
simultaneously elevating the panel relative to the roof of the cabin via an actuator and moving the panel forward relative to the roof of the cabin when moving the panel from the first position to the second position.

14. The method according to claim 13, wherein the step of moving the portion of the panel from its first position to its second position is implemented when an internal combustion engine of the truck is shut down and/or when a park brake is activated.

* * * * *